June 5, 1962
R. GOUIRAND
3,037,544
MEANS FOR CONTROLLING INFLATION AND SUBSEQUENT
PRESSURES IN PNEUMATIC TIRES
Filed Dec. 8, 1958
2 Sheets-Sheet 1
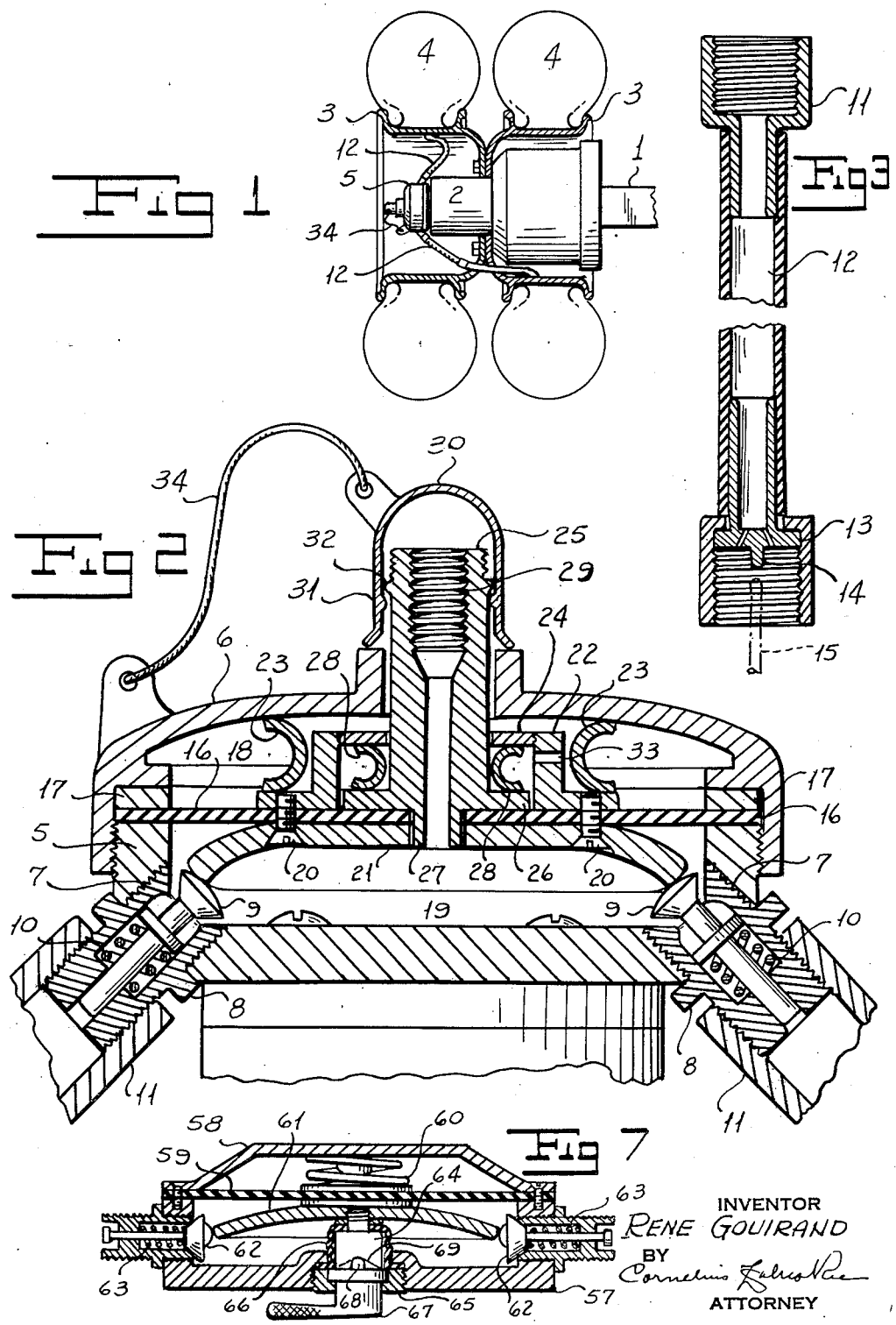
INVENTOR
RENE GOUIRAND
BY
Cornelius Falконке
ATTORNEY

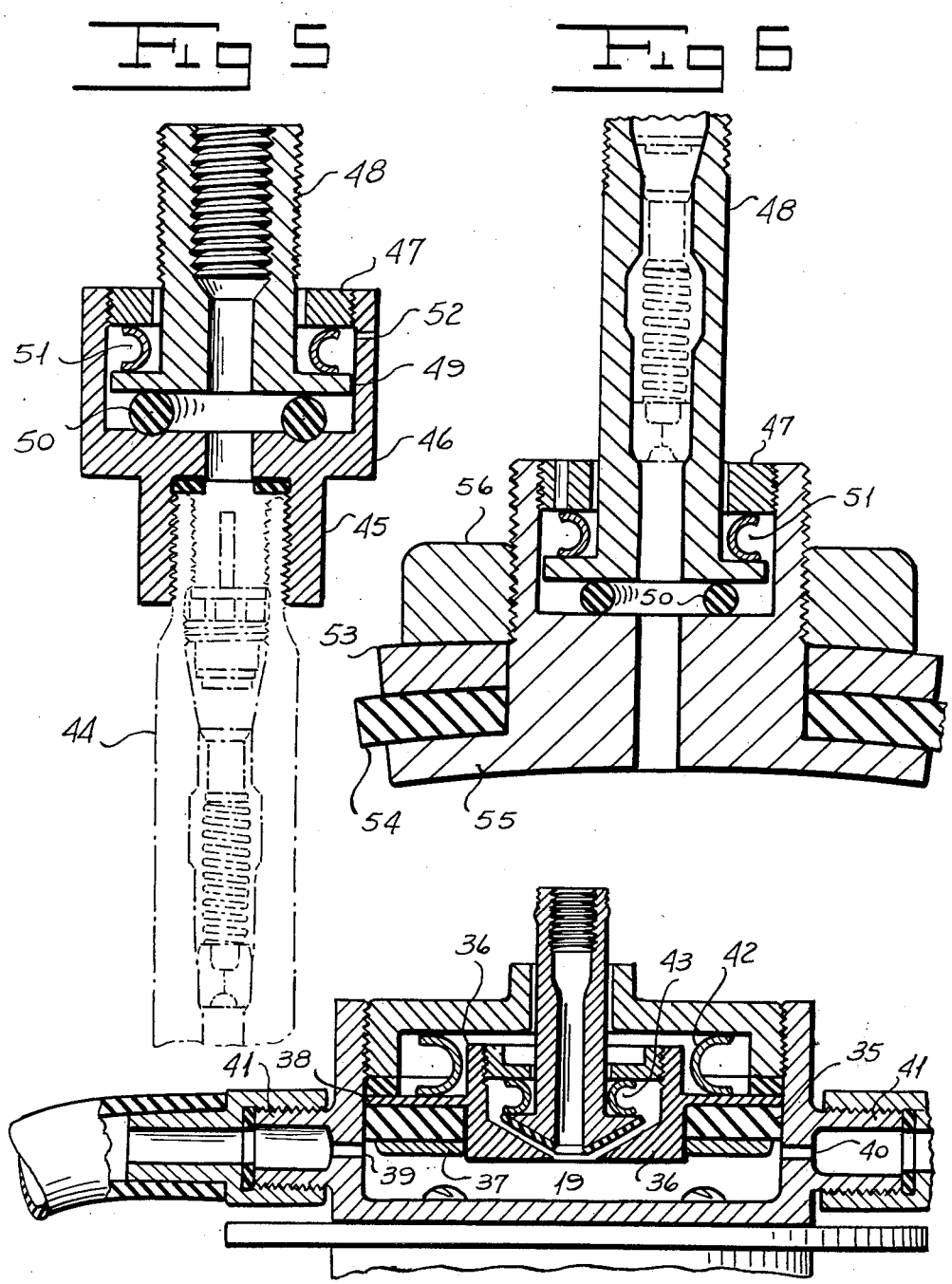

United States Patent Office 3,037,544
Patented June 5, 1962

3,037,544
MEANS FOR CONTROLLING INFLATION AND SUBSEQUENT PRESSURES IN PNEUMATIC TIRES
Rene Gouirand, 210 W. 88th St., New York, N.Y.
Filed Dec. 8, 1958, Ser. No. 778,951
11 Claims. (Cl. 152—415)

This invention relates to means for controlling inflation and subsequent pressures in pneumatic tires and, while in some respects is adapted for use with single or individual tires, is of particular utility when employed in connection with dual tires where two tires are mounted on the same axle in side by side relation.

In the inflation of pneumatic tires, there is the ever present tendency to over inflate such tires, so that they contain higher pressures than those for which they were designed. Also, even though a tire may be inflated to proper pressures, the operation of such tire in hot weather and/or at high speeds may increase the pressures therein to a point where blow-outs are imminent. These facts apply to single as well as dual tire assemblies. One object of the invention is to provide means for safeguarding tires against excessive internal pneumatic pressures during inflation and subsequent thereto.

In the operation of dual tires, it is extremely difficult to apply identical pressures to the individual tires of each pair, so that the one with the higher pressure carries a greater portion of the load. This is undesirable for dual tires should contain the same pressure. It is therefore a further object of the invention to provide means which will insure uniform pressure in both tires during inflation and will maintain such pressures uniform unless or until a blow-out occurs in one of them, whereupon the damaged tire will be automatically cut out so that the remaining tire of the pair may continue to carry the load formerly carried by both tires.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

FIG. 1 is a schematic sectional view, showing dual tires on associated rims which are mounted upon an axle and with which assembly a device embodying the present invention is installed.

FIG. 2 is a central section through the preferred form of device, showing the same in condition wherein the pressures in the dual tires are in equalized condition for use.

FIG. 3 is a longitudinal section of a flexible connection whereby the tire nipples of each of the tires are connected to the device of this invention.

FIG. 4 is a section corresponding to FIG. 2, but illustrating the modified form of the invention.

FIG. 5 is a longitudinal section through a greatly simplified form of device, the function of which is to preclude the admission of excess pressure to a tire during inflation.

FIG. 6 is a view similar to FIG. 5, but showing a modified structure thereof intended primarily for use with tubeless tires.

FIG. 7 shows a device for manually controlling valves, embodying certain principles of valve control found in the structure of FIG. 2.

Referring first to FIGS. 1-3 of the drawings, 1 designates an axle on which is mounted a hub 2 and to this hub is secured the rims 3 of a dual wheel mounting supporting the twin tires 4. On the outer end of the hub 2 is mounted a device embodying the present invention. This may be secured either to the axle or to the hub as may be desired. In any event, it comprises a housing 5 which is rigidly supported and the open side of which housing is closed by a cap 6. The housing 5 has oppositely disposed tapped holes 7 into which is screwed fittings 8 which support valves 9. These valves are biased by springs 10, so that they normally tend to unseat from valve seats at the inner ends of the fittings 8.

The outer end portion of each of these fittings is threaded to receive a coupling 11 to which is connected a flexible hose 12 (see FIG. 3) and to the opposite end of this hose is a second coupling 13 adapted to screw onto the tire nipple of one of the tires 4, so that by a duplicate use of the connection shown in FIG. 3, the respective tires are connected to the fittings 8. A projection 14 is positioned within the coupling 13, so that, when the coupling is screwed onto the tire nipple, the tire valve with which the nipple is equipped is automatically opened. In FIG. 3, the valve stem 15 of the nipple valve is indicated in dot and dash lines.

Interposed between the open side of the housing 5 and its cap 6 is a flexible diaphragm 16 with which is associated a gasket 17 so as to divide the interior of the device into two normally isolated chambers 18 and 19. To the under side of the diaphragm 16 and attached thereto by screws 20 or in any other convenient manner, is a valve closer 21 which, as the diaphragm moves downwardly, engages the heads of the valves 9 and forces them to their seats. When the diaphragm is sprung upwardly, the valve closer permits the valves to open under the pressure of the springs 10.

Superimposed on the diaphragm 16 is a ring 22 having a flange at its base and a spring 23 is interposed between this flange and the cap 6. This spring is shown as of annular form and C-shaped cross section, although it may be otherwise formed and may, if desired, be in the form of a plurality of helical springs arranged in spaced apart relation about the ring 22. In any event the spring or springs are so tensioned that they bias the valve closer 21 into position to seat the valves 9.

Screwed into the upper portion of the ring 22 is an adjusting plate 24 provided with a central opening. Through this central opening extends an inflation tube 25, provided at its lower end with a flange 26 and below this flange the tube is contracted, as at 27, and passes loosely through a central opening in the diaphragm and valve closer. A spring 28 is interposed between the plate 24 and the flange 26 and normally maintains said flange seated on the diaphragm to function as a relief valve. The spring 28 may be of the C-form shown, although it may be in the form of a plurality of helical springs as described in connection with the spring 23. The upper portion of the inflation tube 25 is internally threaded at 29 to receive a check valve, i.e., a conventional nipple valve, such as is ordinarily used with pneumatic tires. The outer end of the inflation tube is normally closed by a cover 30 provided with an internal annular bead 31 which normally underlies a similar bead 32 on the inflation tube, but which may be sprung thereover for reasons hereinafter explained.

Let it be assumed that the invention as shown in FIGS. 1-3 is installed with the dual tires of a truck, trailer or the like, wherein, for the purpose of illustration, each of the tires should carry approximately 75 pounds pressure. In such case the spring 23 should be so tensioned that, when these tires were inflated by passing compressed air through the inflation tube 25, the pressure in the chamber 19 will cause the diaphragm to bulge upwardly sufficiently to permit the valves 9 to open. When such a condition exists, each of the tires will carry 75 pounds pressure, the chamber 19 will carry the same pressure and the spring 23 will be flexed to oppose the same pressure, so that the diaphragm will be in balanced position, the depressor 21 will be elevated, and the valves 9 will be open, whereby there is open communication between both tires through the chamber 19.

If, in inflating the tires to a pressure of 75 pounds in the example given, more than 75 pounds pressure is applied, then and in that event this pressure will act upon the lower end of the inflation tube and will overcome the power of the spring 28 to keep the flange 26 of said tube seated on the diaphragm and excess pressure admitted into the tire will escape through the space thus provided and through an outlet 33 in the side of the ring 22, so that it is impossible to inflate the tires above said predetermined pressure of 75 pounds. In practice some tolerance is desired so that the spring 28 in the example given might be so constituted as to release pressure of 80 pounds.

It will be noted that clearance is shown between the upper edge of the ring 22 and the cap 6. This clearance is to permit some movement of the diaphragm without unseating the flange 28 from the diaphragm 16, but in the event of excessive shock or overload this edge may engage with the cap so as to permit momentary release of excess pressure.

After tires have been inflated in the manner described, the pneumatic pressures referred to will presist as the tires are in use. However, if a blow out should occur, the pressure in the chamber 19 will immediately drop below 75 pounds, whereupon the spring 23 will force down the valve closer 21 and close both valves 9, so that each tire is isolated from the other, and the tire which still retains its pressure may continue to support the load while the other tire remains ineffective for that purpose.

However, if the pressure should drop undesirably in either one or both tires, the spring 33 will force the diaphragm 16 downwardly far enough to move the bead 32 of the inflation tube 25, below the cover bead 31 and the cover will fall off and dangle about on the cord 34 which holds it captive thus serving as notice to the driver that his tires are not functioning properly.

In the construction of FIG. 4, the diaphragm of the preceding figures is replaced by a piston 35 mounted on a central fitting 36 which corresponds to the ring 22. A washer 37 serves to clamp the piston 35 to the flange 38 of the fiitting 36 and this fitting along with the piston 35, which may be of rubber or a plastic, moves up and down to uncover or cover ports 39 and 40. These ports are in register with threaded bosses 41 to which are screwed connectors, such as shown in FIG. 3, for the purpose of connecting the tire nipples of both tires to the ports 39 and 40 respectively. This structure requires no valves corresponding to the valve 9, as the piston 35 seals and unseals the ports as the piston is lowered and raised. The springs 42 and 43 correspond to the springs 23 and 28 and function in the same manner as hereinbefore described, except that the spring 42 controls the position of the piston with respect to the pressure in the chamber 19, whereas the spring 23 controls the position of the diaphragm with respect to the corresponding chamber 9.

The constructions of FIGS. 1–4 are appropriate for use with dual tires. The construction of FIG. 5 is intended for use with a single tire and its purpose is to preclude over inflation of the tire or the release of pressure from the tire if such pressure becomes excessive therein because of heat or fast driving.

In FIG. 5, 44 indicates in dot and dash lines a conventional tire nipple containing the usual tire valve. On this nipple is screwed the internally threaded shank 45 of a cup-like housing 46 onto the top of which screws a perforated adjusting plate 47. The inflation tube 48 is provided at its lower end with a flange 49. Between this flange and the base of the housing is an O-ring 50 and between said flange and the plate 49 is a spring 51. The O-ring 50 is preferably of fairly soft rubber, while the spring 51 is so constituted that it will hold the flange 49 seated on the O-ring so long as the predetermined pressure to which that particular tire is to be inflated, is not materially exceeded. If either the inflation pressure or subsequent pressure generated in the tire becomes excessive, the spring 51 will yield so that the flange 49 will be lifted free from the O-ring and excess pressure will be relieved to escape through an opening 52 in the cap. As soon as the proper pressure is restored, the spring will again seat the flange 49 on the O-ring. In FIG. 5, the conventional nipple valve is shown within the nipple 44. However, when the invention is applied to a nipple, as shown in this figure, this valve is removed from the nipple and positioned within the threaded upper portion of the inflation tube 48, so that the passage through the nipple 44 is left free and unobstructed.

The structure shown in FIG. 6 operates in the identical manner of FIG. 5. The only difference is that FIG. 6 shows the installation of this structure on a rim appropriate for use with a tubeless tire, which tire has no inflation nipple. In this view 54 is a rubber gasket interposed between the flange 55 of the housing and the rim 53 and held in place by a nut 56 screwed onto the housing as shown. In this view a conventional tire valve is shown as mounted in the inflation tube where it belongs according to the embodiments of FIGS. 5 and 6 of this invention.

The structure of FIG. 2 discloses a valve closer mounted on a diaphragm and operatble to close two opposed valves. This closer may be used to control any two valves which are adapted to be actuated by manual operation of the valve closer. Such a structure is shown in FIG. 7. In this view 57 designates a housing having a cap 58 which serves to clamp between it and the housing a diaphram 59, biased in a downward direction by a spring 60. To the under side of the diaphragm is secured a valve closer 61, the opposite ends of which are adapted to act upon opposed valves 62, biased by springs 63 to normally open. The center of the valve closer is provided with a tapped hole into which is screwed a threaded post on a hub 64. Directly below this hub, the housing has a counterbored opening to receive a threaded plug 65. A flexible bonnet 66 of rubber or the like is clamped in place by the plug 65 and the hub 64, so as to preclude leakage from the chamber into which the valves open.

Rotatably mounted in the plug 65 is a handle 67 which is freely rotatable. This handle has at either side camming projections 68 which act against the corresponding camming surfaces 69 on the hub 64. When the handle is in the position shown in FIG. 7, the spring 60 depresses the diaphragm, so that the valve closer 61 engages the valves 62 and closes them against their respective seats. When it is desired to open the valves, the handle is turned through approximately 90 degrees to elevate the hub 64 and correspondingly elevate the valve closer 61, so that the valves are free to open, whereby fluid may pass from one valve to the other through the intermediate chamber in the housing below the diaphragm 59.

The several structures shown in the drawings are positive in their operations and fulfill their functions in a simple and efficient manner. They provide proper safeguards for both single and dual tire assemblies and insure efficient operation and long life of the tires under driving conditions. In the event of blow-out of one of a pair of dual tires, the companion tire remains operative to carry the load and at no time can any of such tires develop pressures which are dangerous.

The foregoing detailed description sets forth the invention in its preferred practical forms, but the invention is to be understood as fully commensurate with the appended claims.

Having thus fully described the invention, what I claim as new and desired to secure as Letters Patent is:

1. In a dual wheel assembly embodying dual tires each of which has a tire nipple and means for equalizing inflation pressures in said valves, the improvement which comprises a housing having therein a normally sealed chamber one wall of which is movable, an inflation tube having a check valve and leading to said chamber, ducts leading from said chamber and attached to the nipples of the dual tires, valves in said ducts spring biased to open, a valve closer carried by said movable wall and acting on the valves of the ducts to seal the ducts when pressure in the chamber falls appreciably below a predetermined maximum and to unseal the ducts when pressure in said chamber is at approximately said predetermined maximum pressure, and a spring biased relief valve in a vent passage leading from said chamber for relieving said chamber of pressures above the predetermined maximum.

2. In a dual wheel assembly embodying dual tires each of which has a tire nipple and means for equalizing inflation pressures in said tires, the improvement which comprises: a valve housing provided with a cap, a flexible diaphragm the periphery of which is clamped between the housing and the cap to form within the base of the housing a chamber, a spring interposed between the cap and the diaphragm for normally biasing the diaphragm in the direction of the chamber, valved ducts leading from the chamber and connected to the nipples of dual tires, the valves of said ducts being normally biased to open, a valve closer mounted on the diaphragm and movable by said diaphragm biasing spring against the valves of the ducts to seal said valves, and a check valved inflation tube also mounted on the diaphragm and leading to said chamber for introducing compressed air into said chamber to flex the diaphragm against the tension of said biasing spring sufficiently to retract the valve closer with the valves of the ducts and permit said valves to open and deliver pressure to the respective tires.

3. In a dual wheel assembly embodying dual tires each of which has a tire nipple and means for equalizing inflation pressures in said tires, the improvement which comprises: a housing having therein a cylinder constituting a chamber, ducts leading from said chamber for attachment to the valve nipples of dual tires, a piston in the cylinder of the housing and axially movable to increase and decrease the volume of the chamber within the cylinder and to seal and unseal said ducts, a spring for biasing said piston in a direction to seal the ducts, and a valved inflation tube leading through said piston to the chamber and through which compressed air may be passed to build up in said chamber a predetermined pressure sufficient to overcome the biasing action of the spring and move the piston into a position to unseal the ducts and permit the entry of such pressure into the respective tires, said inflation tube being axailly movable and having a sealing member normally biased by a second spring into engagement with a seat carried by the piston, said second spring being tensioned to permit said sealing member to be disengaged from its seat to bleed off excessive pressure when said chamber contains pressures above a predetermined maximum.

4. The improvement according to claim 1, wherein the movable wall of the chamber is a flexible diaphragm.

5. A device according to claim 1, wherein the relief valve comprises one sealing member carried by the inflation tube and a cooperating sealing member on the movable wall.

6. A device according to claim 5, wherein one of the sealing members of the relief valve is biased by a spring tensioned to permit disengagement of said sealing members when the pressure in the chamber exceeds the predetermined maximum.

7. A device according to claim 1, wherein the movable wall is biased against pneumatic pressure within the chamber by a spring tensioned to permit closing of the valves of the ducts when the pressure in the chamber drops below the predetermined minimum.

8. The improvement according to claim 1, wherein the valve of each of the ducts is spring biased to automatically open when permitted to do so by the valved closer.

9. The improvement according to claim 2, wherein the inflation tube is normally seated on the diaphragm by a tube seating spring, said tube seating spring being tensioned to permit lifting of the inflation tube from its seat on the diaphragm when pressures in excess of a predetermined maximum are communicated to the chamber for the purpose of relieving excess pressure.

10. The improvement according to claim 1 and in combination therewith means for supporting the housing on the dual wheel assembly which supports the tires.

11. A device according to claim 2 and in combination therewith means for supporting the housing on the dual wheel assembly which supports the tires.

References Cited in the file of this patent

UNITED STATES PATENTS

| | | |
|---|---|---|
| 1,533,322 | Lewis | Apr. 14, 1925 |
| 1,841,140 | Murphy et al. | Jan. 12, 1932 |
| 1,875,509 | Shivers | Sept. 6, 1932 |
| 1,882,455 | Spicer | Oct. 11, 1932 |
| 2,204,530 | Eaton | June 11, 1940 |
| 2,427,445 | Davidson | Sept. 16, 1947 |
| 2,887,123 | Becker | May 19, 1959 |

FOREIGN PATENTS

| | | |
|---|---|---|
| 608,830 | France | of 1926 |